United States Patent
Day et al.

(10) Patent No.: US 7,260,601 B1
(45) Date of Patent: Aug. 21, 2007

(54) METHODS AND APPARATUS FOR TRANSMITTING MEDIA PROGRAMS

(75) Inventors: Mark Stuart Day, Milton, MA (US); James W. O'Toole, Jr., Somerville, MA (US)

(73) Assignee: Cisco Technology, Inc., San Jose, CA (US)

(*) Notice: Subject to any disclaimer, the term of this patent is extended or adjusted under 35 U.S.C. 154(b) by 604 days.

(21) Appl. No.: 10/185,589

(22) Filed: Jun. 28, 2002

(51) Int. Cl.
  *G06F 15/16* (2006.01)

(52) U.S. Cl. ................. 709/203; 709/231; 709/238; 709/220; 370/236

(58) Field of Classification Search ............... 709/203; 370/236
  See application file for complete search history.

(56) References Cited

U.S. PATENT DOCUMENTS

| | | | |
|---|---|---|---|
| 5,892,535 A | 4/1999 | Allen et al. ............... 348/9 |
| 5,901,327 A | 5/1999 | Ofek ............... 710/5 |
| 6,115,379 A | 9/2000 | Flanders et al. .......... 370/392 |
| 6,233,606 B1 | 5/2001 | Dujari ............... 709/213 |
| 6,286,008 B1 | 9/2001 | Matsumoto et al. ........ 707/102 |
| 6,295,380 B1 | 9/2001 | Takahashi ............... 382/240 |
| 6,335,927 B1 | 1/2002 | Elliott et al. ............... 370/352 |
| 6,446,130 B1 | 9/2002 | Grapes ............... 709/231 |
| 6,577,599 B1* | 6/2003 | Gupta et al. ............... 370/236 |
| 6,580,756 B1 | 6/2003 | Matsui et al. .......... 375/240.08 |
| 6,748,447 B1 | 6/2004 | Basani et al. ............... 709/244 |
| 6,775,020 B2 | 8/2004 | Fukunaga et al. .......... 358/1.15 |
| 6,886,029 B1 | 4/2005 | Pecus et al. ............... 709/203 |
| 6,909,726 B1* | 6/2005 | Sheeran ............... 370/468 |
| 6,937,599 B1 | 8/2005 | Yoshida et al. ............... 370/390 |
| 2001/0044851 A1* | 11/2001 | Rothman et al. ........... 709/231 |
| 2002/0069406 A1* | 6/2002 | Aaltonen et al. ............. 725/34 |
| 2002/0129159 A1* | 9/2002 | Luby et al. ................ 709/236 |
| 2002/0143975 A1 | 10/2002 | Kimura et al. ............... 709/231 |
| 2002/0172368 A1 | 11/2002 | Peterka ............... 380/278 |
| 2003/0103521 A1 | 6/2003 | Raphaeli et al. ............. 370/445 |
| 2003/0231629 A1 | 12/2003 | Banerjee et al. ............. 370/390 |
| 2003/0233540 A1 | 12/2003 | Banerjee et al. ............. 713/153 |
| 2004/0042479 A1 | 3/2004 | Epstein et al. ............. 370/432 |

OTHER PUBLICATIONS

U.S. Appl. No. 10/263,963, Entitled "Methods and Apparatus for Distributing Content Within a Content Delivery System", filed Oct. 3, 2002 by Mark Stuart Day.

* cited by examiner

*Primary Examiner*—Zarni Maung
*Assistant Examiner*—Glenford Madamba
(74) *Attorney, Agent, or Firm*—Bainwood Huang

(57) ABSTRACT

A system transmits a plurality of media programs in a network. In one embodiment of the invention, a media program distribution system determines a first resource attribute of a first media program and a second resource attribute of a second media program. The distribution system compares the first resource attribute with the second resource attribute to determine a relative value. In turn, the media server assigns a first distribution resource to the first media program and a second distribution resource to the second media program in response to the relative value and applies one of a plurality of transmission modes to each media program in response to the resource attribute and distribution resource type. Examples of distribution resources include unicast, multicast and broadcast channels. Examples of transmission modes include various protocols such as error checking protocols and encoding mechanisms such as codecs.

25 Claims, 7 Drawing Sheets

| | MEDIA PROGRAM | AUDIENCE SIZE |
|---|---|---|
| 1 | MEDIA A | SIZE A |
| 2 | MEDIA B | SIZE C |
| 3 | MEDIA X | SIZE X |
| 4 | MEDIA Y | SIZE Y |
| 5 | MEDIA B | SIZE B |
| 6 | MEDIA C | SIZE C |
| 7 | MEDIA Z | |

800

| XMISSION MODE | MINIMUM LIMIT | MAXIMUM LIMIT |
|---|---|---|
| ACK | 1 | 5 |
| NACK | 6 | 20 |
| FEC | 21 | 5000 |
| NONE | 0 | 0 |
| ... | ... | |

METHODS AND APPARATUS FOR TRANSMITTING MEDIA PROGRAMS

BACKGROUND OF THE INVENTION

As the Internet continues to grow in popularity, providing streaming media such as video content to the online public is also continuing to grow in popularity. Streaming media is a technique for transferring data such that it is processed as a steady and continuous stream. Streaming media is an important technique for distributing large quantities of data because a client system can start displaying the data before the entire file is transmitted. Ideally, the client system receiving the data must be able to collect the data and send it as a steady stream to the application processing the data and converting it to sound and pictures. If the client system receives data more quickly than required, the client system needs to save the excess data to a buffer. If the data is not received quickly enough by the client system, the presentation of the data is not smooth.

Various distribution techniques such as unicast, multicast and broadcast distribution are used for media content delivery.

Unicast distribution is a methodology for distributing content in which the sending server transmits a separate copy of the content over a network to each individual recipient. This technique is simple to implement, but it has significant scaling restrictions if the recipient group is large. In addition, unicast distribution requires extra bandwidth because the same information has to be carried multiple times, even on shared links.

Multicast distribution is a methodology for distributing content whereby the sending server sends out a copy of the content addressed to all of the intended recipients. In IP multicast, a single message is transmitted from a source and the network replicates the message as needed in any particular leg of the network route necessary so that the content reaches each of the different intended recipients. Application-layer multicast schemes typically involve organizing members of a multicast group into a mesh topology in which each node in the topology maintains a state for some number of other nodes sufficient to maintain a high degree of reliability of connectivity. For large amounts of data, multicast distribution is more efficient than unicast transmission because the server sends a message to many recipients simultaneously, but as recipient groups grow large, multicast distribution loses efficiency compared to broadcast distribution. Efficiency of multicast distribution relative to unicast distribution is greatest in areas of the network close to the transmitter and also where there are a plurality of receivers in the same local area network such as in a residential neighborhood or corporate office building, all receiving the same transmission.

Like multicast distribution, broadcast distribution is a methodology in which the same message is sent to multiple recipients. Broadcasting, however, sends a message to all recipients in the network whereas multicasting sends a message to a select list of recipients.

Both multicast and application-layer multicast require some memory resources and some message costs per-ongoing transmission or active receiver/receiver-group. Therefore, multicast distribution typically has some in-network cost related to the size of the audience, even though it usually consumes less bandwidth for a given data message than unicast distribution. Neither unicast nor broadcast requires much, if any, in network memory or administrative messaging, though they consume more bandwidth. Whether broadcast or unicast distribution consumes the most bandwidth depends on the size of the audience relative to the size of the total network. For these reasons and the fixed and variable costs associated with the deployment and operation of data communication networks, there are limited amounts of unicast, multicast and broadcast capacity, respectively, available to network users, and the cost of using capacity of each type may differ from the others and vary over time.

Media content, as distributed by the various distribution techniques described above, is transmitted over a network using one of a number of combinations of formats and protocols. Examples of streaming video file formats are Advanced Streaming Format (ASF) developed by Microsoft Corporation and QuickTime File Format originating from Apple Computer Corporation.

Media content files tend to be very large files and require some data compression in order to be transmitted over a network followed by some decompression in order to be played at the recipient. The hardware or software performing the compression and decompression is typically referred to as a codec. There are many codecs to choose from when sending data across a network. Typically, a codec is selected according to the file format being transmitted.

Other factors in data transmission are error correction protocols. Various error correction protocols are used in media distribution, including protocols such as acknowledgment (ACK) protocols, negative acknowledgment (NAK) protocols and forward error correction codes. An ACK code is a transmission control character used to indicate that a transmitted block of video content was received without errors and that the recipient is ready to accept additional transmissions. The recipient sends an ACK to the sender to indicate that the transmission has been accepted. If the sender does not receive an ACK from the recipient within a predetermined timeframe, the sender interprets the failure to receive the ACK as an indication that the associated block of video content failed to reach the recipient successfully and will resend the block of video content. Although the use of error correction protocols using ACK's can increase transmission accuracy, the increase in accuracy occurs at the expense of a decrease in bandwidth (i.e. a reduction in the capacity of signal transmission due to the consumption of transmission capacity by the ACK's) and consumption of computational resources for processing ACK's.

In contrast to methods using ACK codes, NAK codes are employed to report to a sender when blocks of video content have been received with errors or corruption, rather than report all of the blocks that are received without errors (i.e. as in the case of an ACK-based protocol). The recipient sends a NAK code to the sender to indicate that such a block, received by the recipient, with errors or corruption, must be present. Upon receipt of such a NAK, the sender will resend the appropriate block to the recipient. In the case of connections with a small amount of errors and/or corruption, NAK-based protocols typically consume less bandwidth than ACK-based protocols. Other methods for employing ACK or NAK codes also exist, such as, for example, periodically transmitting ACK's or NAK rather than exchanging them in response to a successful transmission of a block of video content or exchanging them in response to a block of video content with errors or corruption. Both ACK and NAK-based protocols have some versions where ACK or NAK messages may be processed by in-network devices such as routers and switches. This processing typically reduces the requirement for ACK/NAK processing by the sender, but requires the usage of additional memory resources in the participating routers and switches.

In order to determine if a block of content has been received accurately, in both the ACK and NAK based error correction protocols, both the sender and recipient perform a numeric analysis of the video content block sent by the sender and received by the recipient, which generates a numerical code that can be checked in order to determine if errors of corruption has occurred in the block of video content. The sender can send such a code to the recipient after conducting the numerical analysis. Upon receipt of the code, the recipient conducts a parallel numerical analysis of the block of video content to generate an equivalent numerical code. The recipient can then compare the numerical code that the sender created, which it received from the sender, to the numerical code that the recipient calculated and if the recipient finds that the numerical codes are not equal, determine that the block of video content received has experienced an error or corruption. A failure of the two codes to match indicates that corruption has occurred during the course of transmission of the video content, thus indicating that the block in question should be resent by the sender. A match of the two codes by the recipient indicates the completion of a successful transmission of the block of video content. Various alternative methods of calculating the numerical codes include the generation of check bits, cyclic redundancy check codes, and others.

Forward error correction is another method for providing error correction of video content. Forward error correction is a method by which the sender duplicates some of the content (e.g. certain data that is part of the video content) that the sender sends to a recipient. The recipient, upon making a determination that the video content, which the recipient received, has errors or was corrupted, uses the duplicate content to re-create the content originally transmitted. Various schemes are used to determine which content and how much redundant content should be transferred between the sender and recipient. Although forward error correction can reduce transmission errors, it consumes transmission and processing capacity.

SUMMARY OF THE INVENTION

Current media distribution lacks efficiency in utilization of distribution resources in networks and in optimization of transmission mode, which includes selection of protocols and codecs.

A distribution system for media programs having broadcast, multicast and unicast distribution resources and a plurality of transmission protocols and codecs assigns distribution resources in response to audience size and applies transmission protocols and codecs to provide optimal data transmission in a dynamic network environment.

Each of the diverse distribution resources, the broadcast resource, the multicast resource and the unicast resource has one or more channels for distributing media programs. The most popular programs are distributed via the distribution resource having the widest distribution capability and the less popular programs are distributed via resources having narrower distribution capability. For example, broadcast channels are typically limited in number and ideally, the most popular programs are broadcast over those channels rather than be distributed using multicast or unicast methods.

In order to distribute media programs efficiently in the network, the assignment of media programs to particular distribution resources cannot remain static because audiences, loss rates and resource costs are not static. A program that was the most popular at one moment may not have a sizable audience some time later and so is swapped off a broadcast channel to a multicast channel or even a unicast channel.

Further, each transmission is optimized with regard to protocol and codec. The determination of optimum transmission mode can be a complicated selection process. The present invention addresses this problem and enables the selection to be more efficient.

The present system operates using a distribution hierarchy wherein content to be distributed is organized in terms of audience reach (higher levels of the hierarchy reach more viewers per bit transmitted). The most popular content receives the distribution resource capable of the highest audience reach. The distribution resources include a broadcast resource, multicast resources and a unicast resource. The broadcast resource can carry only a limited number of the most popular programs. Once all the programs that can be carried by the broadcast resource have been assigned, the remaining programs are assigned to multicast resources and then unicast resources going down the distribution hierarchy from the most popular to the least popular. Each media recipient has a control connection to the distribution system. The control connection is maintained regardless of whether the connection is used for program data.

The distribution system maintains a data structure representing the collection of all programs, audience size and distribution resource. The distribution system updates the audience size for each program over time and updates the distribution hierarchy accordingly. The media programs are then reassigned to distribution resources appropriate to the updated audience sizes.

Specifically, the broadcast resource has only a limited number of channels, or bandwidth, for distributing media programs. Each potential viewer has both the broadcast, multicast, and unicast resources available. The broadcast mechanism is used for the most popular programs. At $T_0$, the distribution system distributes no programs. Each viewer interested in a program uses the unicast mechanism to request a media program. For each program, the distribution system maintains the number of viewers based on the unicast connection information, even if the content is not distributed via unicast. That is, the unicast connection is used as a control and signaling mechanism even if it is not carrying the program. Each viewer maintains a 1-1 connection with the distribution system.

In a first embodiment of the present invention, the system maintains a data structure representing the collection of all programs being unicast and (separately) another data structure representing the collection of all programs being broadcast. There are never more than some limited number of programs being broadcast. A specific program is either in the collection of unicast programs, or in the collection of broadcast programs, or is having its proper place decided. No program is ever simultaneously in the unicast collection and the broadcast collection.

The system repeatedly picks the program with the largest audience from the unicast collection, and compares its audience size to the program with the smallest audience in the broadcast collection. If the program currently being unicast has a larger audience, the programs are swapped. That is, the broadcast program is switched to unicast transmission and the unicast program is switched to broadcast transmission. The distribution system sends signals over the unicast connections to the recipients that the transmission of the media programs has changed.

The basic mechanism of swapping programs between the two levels can be repeated with an arbitrary number of levels.

The choice of facilities for transmission of any particular video content depends on the size of the audience and the capabilities of the technology resources available. Conventional network systems leave the choice of protocol and codec to be treated as an architectural issue for resolution by engineers at design time. Once transmission facilities are committed to a particular network design configuration in a conventional network system, it is difficult or impossible to make changes in the network configuration in order to provide optimal transmission in an environment of constantly changing content and distribution methods.

In addition, certain conventional distribution methods, such as multicast distribution do not scale well to large numbers of recipients. Examples of that phenomenon include transmission of video content in which error correction is provided using per-packet ACK'S, per-time-period NAK's and content-based re-transmissions. These configurations may not adjust well to accommodate to an increase in the demand for transmission capacity needed to distribute the video content to larger audiences. Accordingly, transmission of video content that is practical for small audiences typically becomes impractical to maintain if the audience size increases and creates a variety of different capacity, speed, and other problems.

Additional problems arise due to the fact that features and characteristics of one network configuration for transmitting certain video content may not be well suited for providing other video content. For example, certain error correction protocols used in one configuration, even though they are able to scale well (e.g. able to meet the increased demand of a growing audience without transmission degradation), are costly on a per unit basis and therefore are not well suited to cost sensitive network applications. Other configurations are well suited to large or small audiences, but are inadequate if used in conjunction with network facilities that have high noise ratios and, for example, in turn, experience a problematic growth of bandwidth requirements. In sum, a particular configuration may be adequate for transmission of certain types of content, but inadequate for other types of content.

The present invention provides a method for real time selection between different network configurations for transmitting video content depending upon a variety of conditions and circumstances. The method involves establishing a unicast connection with a recipient seeking to receive the media program. The distribution system maintains the unicast connection as a control connection even though, in many cases, transmission of the actual media program is switched to another distribution resource such as a multicast or broadcast transmission. The media server uses the control connections to track media program resource attributes such as audience sizes as well as for control signals.

Media program and media program resource attributes such as audience size, transmission loss ratios of the media programs or other resource attributes are stored in a data structure (e.g. a table). The media server evaluates the resource attributes and assigns a distribution resource to transmit a media program and applies various transmission modes in order to ensure optimal utilization of network resources. The media server undertakes such steps in conjunction with new requests for media programs and may swap already-transmitting media programs between distribution resources and transmission modes.

For example, media programs are swapped between unicast and broadcast distribution resource channels in order to ensure that programs with the largest audiences use the available broadcast channels. In another example, multicast programs are swapped between using Pragmatic General Multicasting (PGM) and forward error correcting protocols based on a pre-determined number of transmission channels of either protocol that the media server is able to handle. When the media server initiates a swapping of media programs between transmission modes, the media server sends a notification to the media program recipient of the changing mode of transmission. Examples of different transmission modes include ACK, NAK (e.g. PGM), various forward error correcting protocols and various encoding methodologies (e.g. codecs).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8 shows a transmission mode table with minimum and maximum audience limits according to one embodiment of the invention.

DETAILED DESCRIPTION

A distribution system for media programs having broadcast, multicast and unicast distribution resources and a plurality of transmission protocols and codes assigns distribution resources as audience size changes and applies transmission protocols and codecs to provide optimal data transmission in a dynamic network environment.

Figure 1:
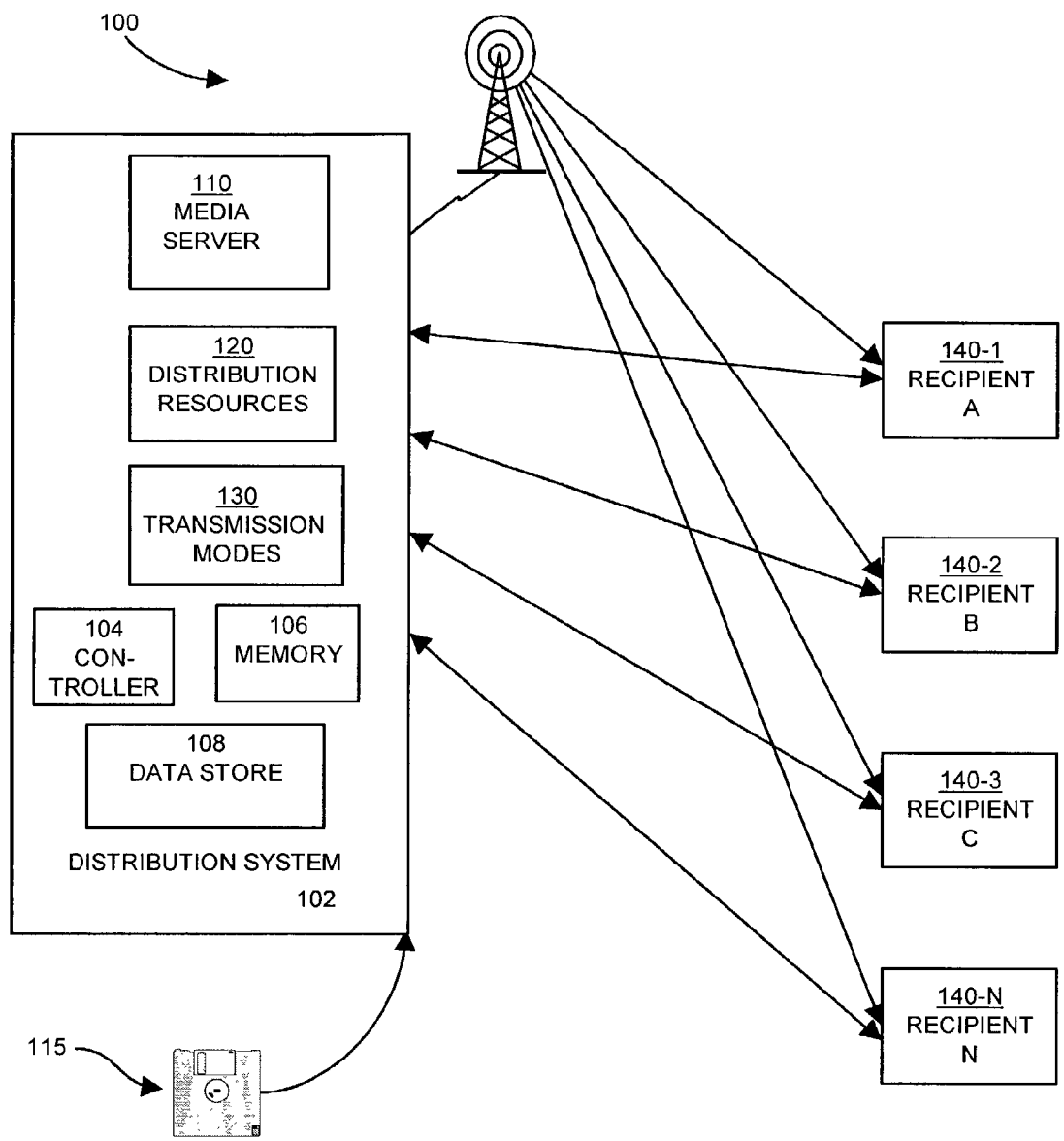
FIG. 1 illustrates a computer network environment suitable for use in explaining example operations of embodiments of the invention.

FIG. 1 illustrates a computer network environment 100 suitable for use in explaining example operations of embodiments of the invention. The environment 100 includes a media program distribution system 102 having a controller 104, a memory 106 and a data store 108. The distribution system further includes a media server 110, a plurality of distribution resources 120, and a plurality of transmission modes 130. The system also has a plurality of media program recipients 140.

The media server 110 transmits media programs over one or more connection types to various recipients 140. The media server 110 uses one of several different distribution resources 120 for transmission of a media program. Examples of such distribution resources 120 include unicast, multicast, and broadcast distribution. The media server 110 also applies one or more transmission modes 130 to the media program for use in transmission of the media program. Such transmission modes 130 include, for example, ACK, NAK, forward error checking protocols and encoding methodologies, also called codecs.

The distribution system 102 has a control connection to each recipient 140. The control connection is established at the time the recipient sends a request to receive a media program. The distribution system 102 uses the control connection to determine the number of recipients 140 for a particular media program, as will be discussed in more detail later. The distribution system 102 uses the control connection to signal the recipient about changes in media program transmission including the channel of distribution. In one embodiment of the invention, the control connection is also used as the unicast connection for media program delivery to the recipient.

Figure 2:
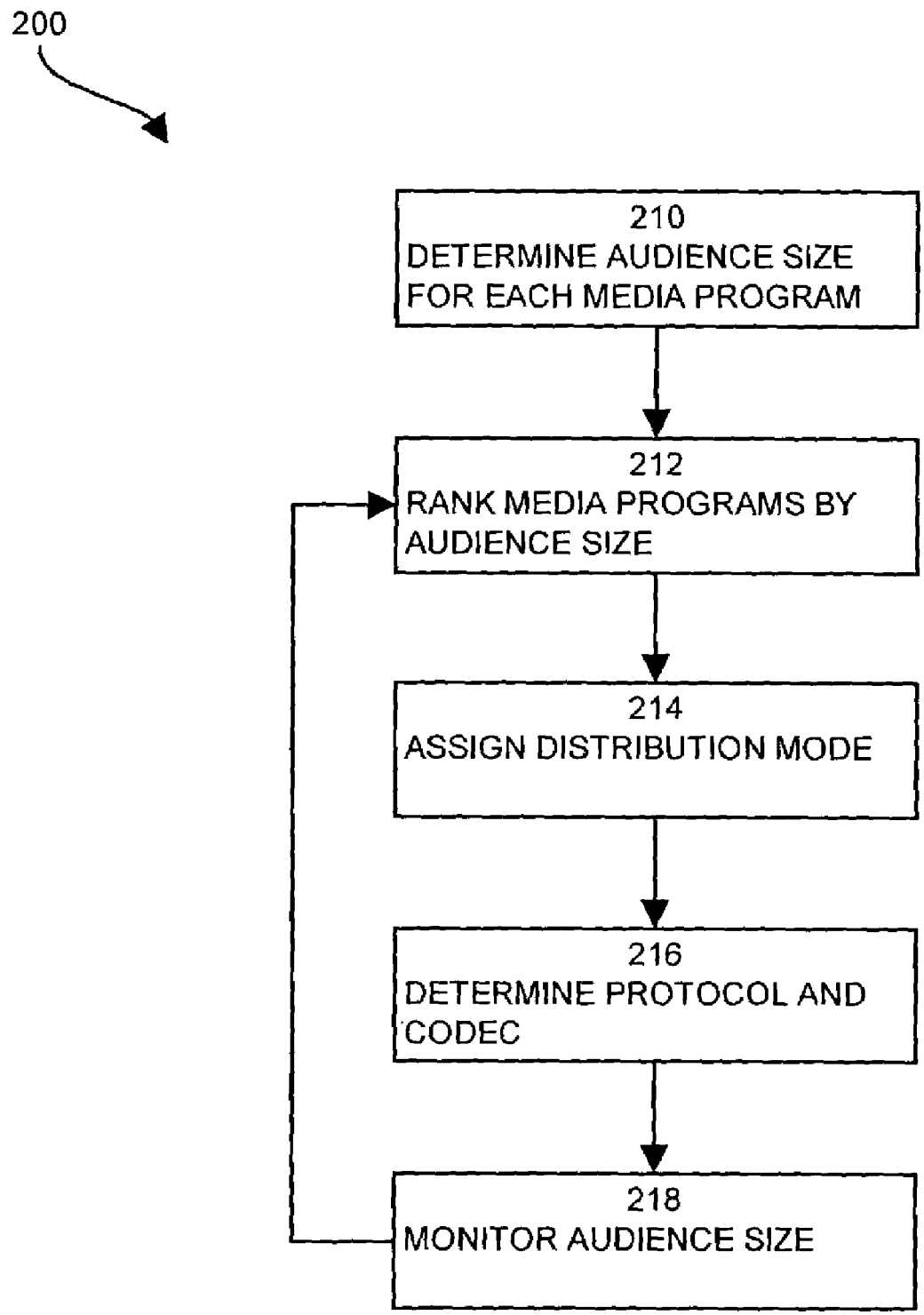
FIG. 2 is a flow chart of a procedure for assigning a distribution mode and determining a protocol and codec for use in transmitting a media program according to one embodiment of the invention.

FIG. 2 is a flow chart of a procedure for assigning a distribution resource 120 and applying a transmission mode 130, such as a protocol and type of codec for use in the transmission of a media program.

In order to make a determination about which distribution resource 120 the media server 110 will assign to a media program for transmission, the media server 110 determines a first resource attribute of a first media program and a second resource attribute of a second media program and compares the first resource attribute with the second resource attribute in order to determine a relative value. In turn, the first distribution resource 120 is assigned to the first media program and the second distribution resource 120 is assigned to the second media program in response to the relative value, whereby assignment of distribution resources 120 is made, for example, based on relative audience size. In general, the embodiments of the invention provide a method wherein the first distribution resource 120 is a high distribution volume channel and the second distribution resource 120 is a low distribution volume channel, such that the relative value indicates a distribution requirement such that the high distribution volume channel is assigned to the media program having the greater distribution requirement.

For example, after receiving media program requests from one or more of the plurality of recipients 140, the distribution system 102 determines the first resource attribute which is a first audience size and the second resource attribute which is the second audience size. Different distribution resources have various capabilities of audience reach, therefore audience size is an important attribute to consider in optimal utilization of network resources. In an efficient network, the media programs having the larger audiences are assigned the distribution resources having the widest audience reach while the media programs having the smaller audiences are assigned distribution resources having narrower reach.

In step 212, in this example, the media server 110 ranks media programs by audience size, that is, by relative value. In a first embodiment of the invention, each distribution resource type maintains a table of media programs and associated attributes. In this first embodiment, for example, the broadcast resource, the multicast resource and the unicast resource each have a table of media programs being transmitted by the particular distribution resource along with associated audience sizes. In a second embodiment of the invention, the distribution system 102 maintains a single table of media programs and audience sizes, the media programs ranked in audience size order.

In step 214, the distribution resource 120 is assigned to one or more media programs. The media program having the larger audience size is assigned to a distribution resource having the widest reach and the media program having the smaller audience is assigned to the distribution resource having the smaller reach. For example, if the first audience size is one media program recipient and the second audience size is ten program recipients, then based on the relative audience size, the second media program, having an audience size of ten, would receive a broadcast channel (e.g. and use a broadcast channel distribution resource 120). In an alternative example, the media server 110 assigns a multicast distribution resource 120 to a second media program having a larger audience (e.g. than the first media program). By using this method the media server 110 can assign media programs with the larger audiences to distribution resources 120 which are more appropriate and assign the media programs with smaller audiences to a unicast distribution resource 120. For example, the media server 110 determines that it will transmit to a media program that has a resource attribute of an audience size of 10 media program recipients 140 to a recipient 140, and that as a consequence, the media server 110 assigns a multicast distribution resource 120 to transmit the media program.

In step 216, the media server 110 determines a protocol and codec to be applied to the process of distributing one or more media programs. The media server 110 applies one of the plurality of transmission modes to each media program in response to the resource attribute and distribution resource 120 type. For example, based on the resource attribute of a 10 recipient audience size, the media server 110 applies a negative acknowledgment-based error correction protocol to the media program for transmission.

The media server 110 may also be configured to apply one of a plurality of transmission modes based on factors associated with the resource attribute (e.g. an audience size or some other criteria). For example, an ACK-based error correction protocol may be applied to transmission of one or more media programs in the case of media programs transmitted to a small number of recipients. In contrast, because of the greater amount of bandwidth consumed by the transmission of acknowledgments used in an ACK-based error correction protocol, other methods are preferred for use data transmission to larger audiences. As a consequence, the distribution system 102 is configured to apply a protocol having lower network overhead such as a negative acknowledgment-based error correction protocol or forward error checking protocol to a media program where the audience size is large.

The distribution system 102 also applies other transmission modes to media programs in response to the resource attribute and distribution resource 120 type. For example, encoding mechanisms (e.g. software or devices), sometimes referred to as "codecs" may be applied to the media programs. Other transmission modes may also be applied to media programs. The transmission modes listed here are merely examples. The possible transmission modes are not limited to those listed here.

In step 218, the distribution system 102 monitors the audience size. Audience sizes can fluctuate over time. The distribution system 102 monitors the relative value of the first and second attributes and reassigns the low distribution volume channel to the media program having the smaller audience and the high distribution volume channel to the media program having the larger audience. In the alternative, the media server 110 determines the relative value of the first and second resource attributes by ranking the audience sizes of the media programs, as described earlier. This processes of monitoring and ranking is repeated continuously.

Figures 3, 4:
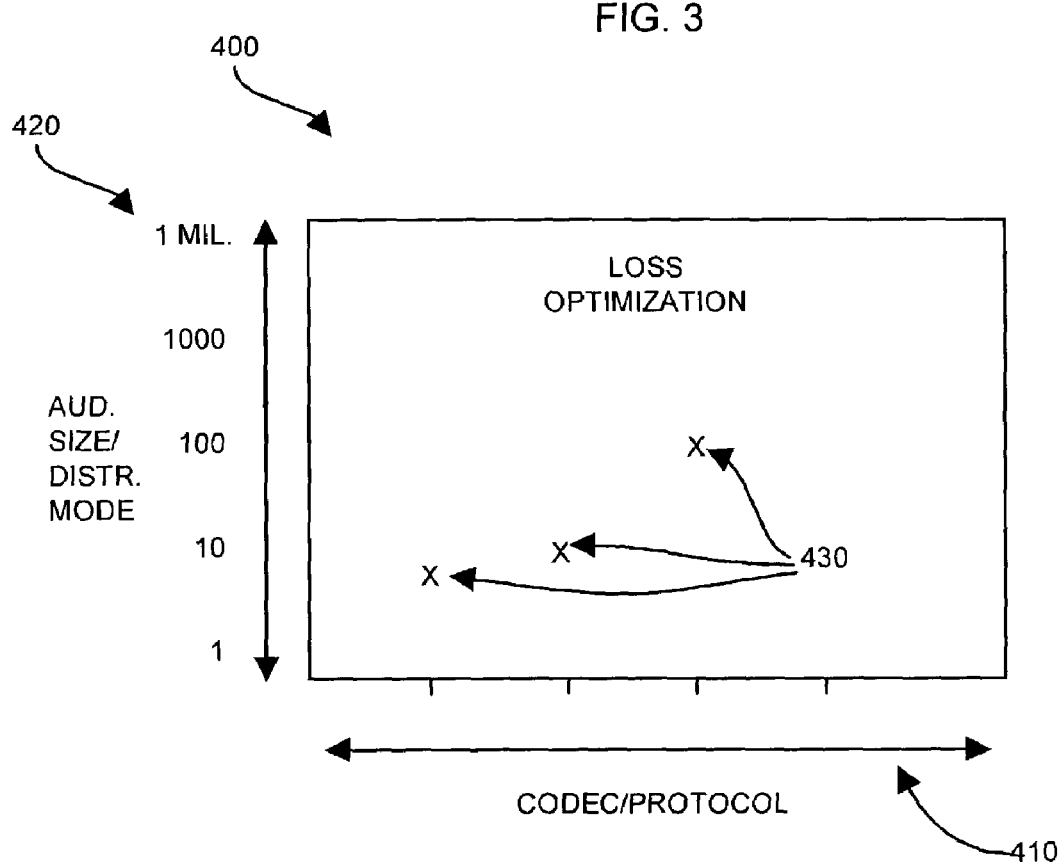
FIG. 3 shows an attribute table containing a list of media programs and associated audience sizes according to one embodiment of the invention.
FIG. 4 shows a graphic distribution mode and transmission mode table depicting intersecting distribution mode and transmission mode values for transmission loss optimization according to one embodiment of the invention.

FIG. 3 shows an attribute table 300 containing a list of media programs 310 and associated audience sizes 312 according to one embodiment of the invention. The media programs 310 and audience sizes 312 are stored in the data storage 108 of the distribution system 102. The distribution system 102 is configured to compare first audience sizes to second audience sizes, successively, in order to determine the relative values or rank of all of the media programs as described earlier. In the present embodiment of the invention, media programs are stored in order of audience size. Other ranking mechanisms are possible.

In an alternative embodiment of the invention, the table for each distribution resource are compared and media programs are swapped between distribution resources and tables as audience sizes change.

The distribution system 102 monitors audience sizes and updates the media program 310 and audience size 312 data accordingly. In one embodiment of the invention, the distribution system updates the audience sizes with each recipient request for a media program. In another embodiment, the updating is performed periodically.

FIG. 4 shows a distribution mode and transmission mode table 400 depicting intersecting distribution mode and transmission mode values 430 for obtaining transmission loss optimization according to one embodiment of the invention. The table "x axis" 410 represents one or more codecs or protocols (e.g. such as error correction protocols); the "y axis" 420 represents various media programs audience size and distribution modes.

The distribution mode and transmission mode table 400 is designed to identify the points (or ranges) at which the intersecting points 430 of the "x axis" and "y axis" represent the best combination of choices of codecs or protocols and the various media programs audience size and distribution modes respectively, in order to achieve optimization of transmission loss. That is, a transition mode table is provided where each codec or protocol has an associated attribute value such as a loss rate. The detected resource attribute value is compared to resource attribute values in the transmission mode table and at least one transmission mode having an associated attribute value substantially matching the detected resource attribute is identified. The selected transmission mode to then applied to the media program transmission.

For example, in order to reduce transmission loss to the smallest possible level for a particular media program distributed to an audience of 10 recipients, "CODEC B" is assigned. In order to reduce transmission loss to the smallest possible transmission loss for a particular media program distributed to an audience of 100 recipients, "CODEC C" is assigned. Such tables can also be optimized for other factors as well. For example, such a table could be optimized to minimize network costs, or other factors.

Other methods may also be employed to select audience size/distribution modes and or codec/protocols. For example, in an alternative embodiment, the media server 110 uses a table containing minimum and maximum audience size values for each codec/protocol to be selected, as will be described in more detail with respect to FIG. 7.

Figure 5:
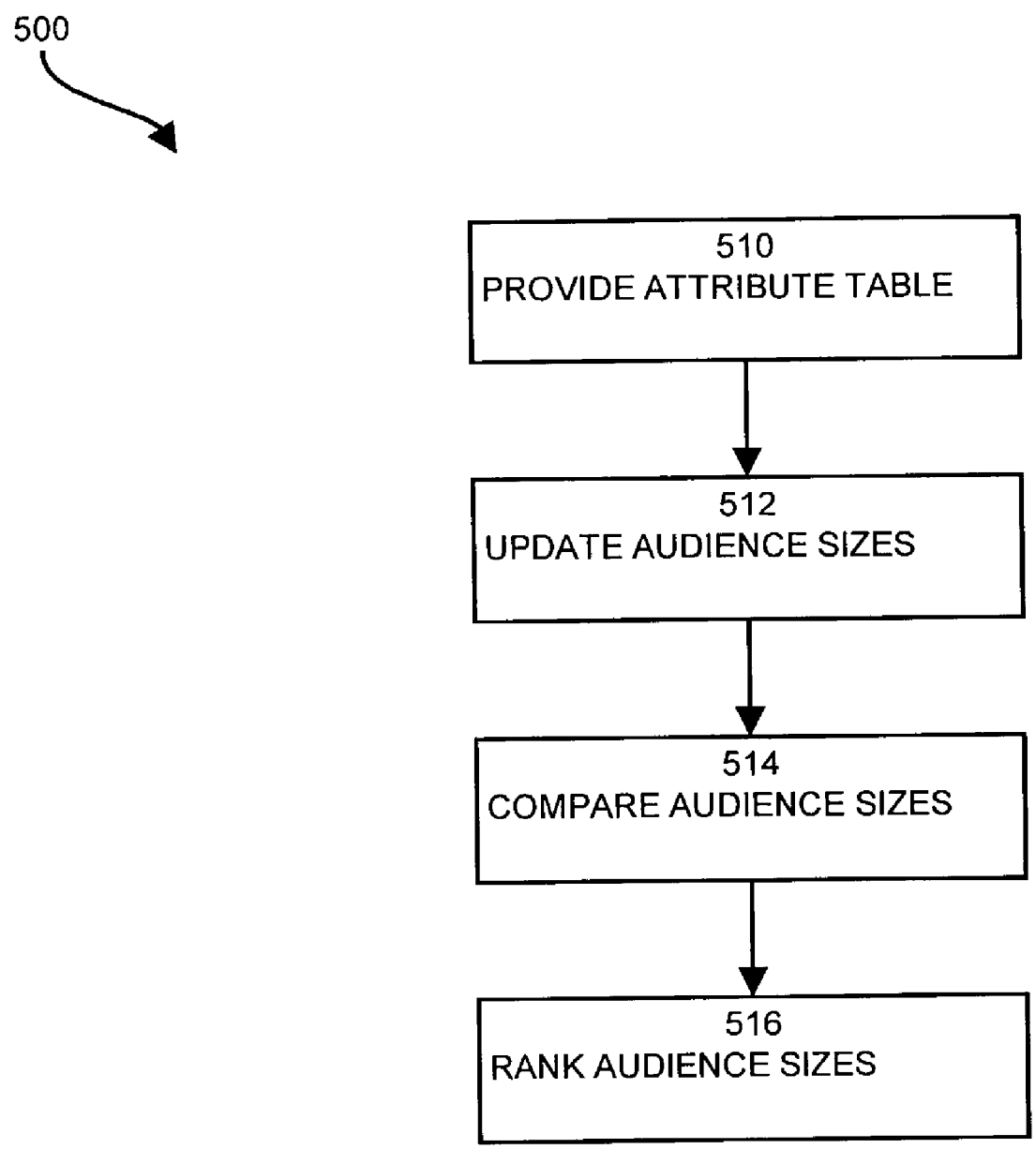
FIG. 5 is a flow chart of the details of a procedure for monitoring audience sizes of media programs according to one embodiment of the invention.

FIG. 5 is a flow chart of the details of a procedure for monitoring audience sizes of media programs according to one embodiment of the invention.

In FIG. 510, the media server 110 provides an attribute table 300 such as the table depicted in FIG. 3.

In FIG. 512, the media server 110 updates the stored resource attributes 312 (e.g. audience sizes). In one alternative, the media server 110 uses the resource attributes at the time that the resource attributes (i.e. audience sizes) are determined (e.g. when the audience sizes change). In another alternative, the media server updates the resource attributes 312 on a different schedule, such as, for example, periodically, or some other schedule.

In FIG. 514, the media server 110 compares the stored resource attributes 312. As described earlier, in one configuration of the embodiments of the invention, a first resource attribute of a first media program is compared to a second resource attribute of a second media program (e.g. in this case, both selected from the attribute table). Such a comparison provides the basis for establishing a relative value that, in turn, is used to determine which distribution resource 312 channels to assign to the first and second media programs.

In another embodiment of the invention, some or all of the resource attributes 312 of the attribute table 300 are compared to each other, in order to rank the resource attributes 312, as described in step 516. In turn, such resource attributes provides the basis for assignment of the distribution resources 320.

In FIG. 516, the media server 110 ranks the stored resource attributes to determine distribution requirements. Based on the ranking of the stored resource attributes, the media server determines the distribution requirements.

Figure 6:
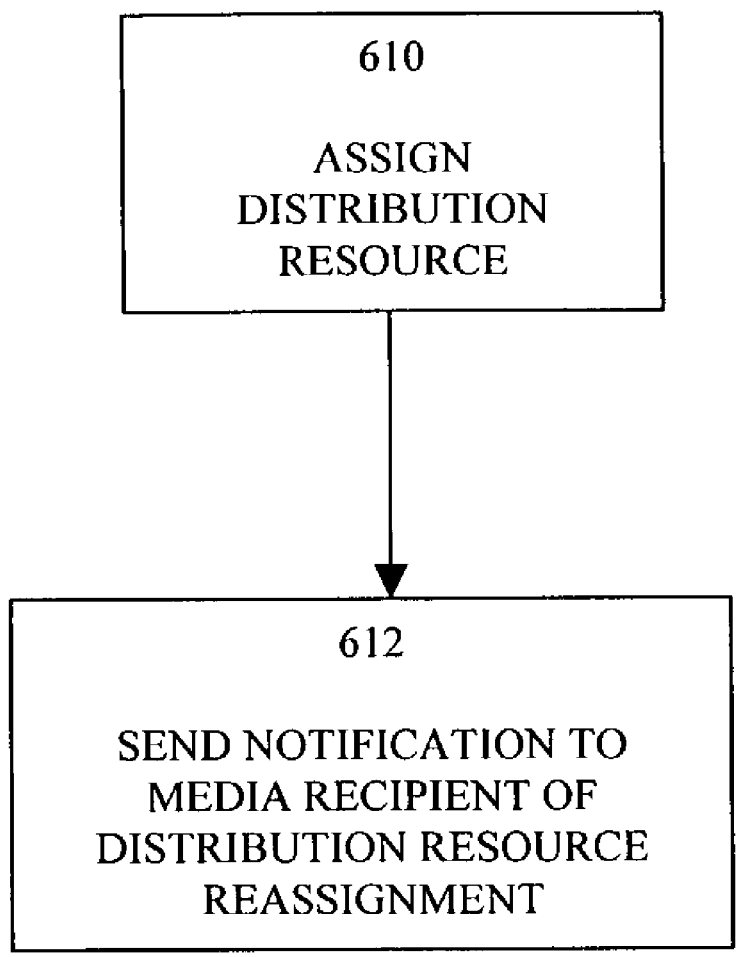
FIG. 6 is a flow chart of a procedure for notifying media recipients of the occurrence of distribution resource reassignments according to one embodiment of the invention.

FIG. 6 is a flow chart of a procedure for notifying media recipients 140 of a distribution resource 120 reassignment according to one embodiment of the invention.

In step 610, the media server 110 assigns a distribution resource 120 to a media program, as discussed in more detail with respect to FIG. 2.

In step 612, the distribution system 102 sends notification to the media recipient 140 of a distribution resource assignment. As described earlier, the control connection is the actual initial connection established between the distribution system 102 and the media program recipient 140. In one embodiment of the invention, the control connection serves a dual role of providing both control signaling and unicast distribution of media programs. Even if the distribution of a media program is reassigned to another type of distribution resource 120 such as a unicast or a multicast distribution resource 120 channel, the media server 110 continues to maintain the unicast control connection to each media program recipient 140 in order to provide a mechanism for exchanging control signals between the media server 110 and any such media program recipients 140.

Reassignments of distribution resources may be undertaken by the media server 110 in response to the relative value (i.e. determined by comparison of a first resource attribute with a second resource attributes) as described in more detail with respect to FIG. 2. In this embodiment, the notification to the media program recipient 140 serves as a basis for the media program recipient 140 to initiate appropriate action in conjunction with changes of distribution resources 120.

For example, such a notification of distribution resource 120 reassignments informs a media program recipient 140 that the recipient 140 must load and execute different software in order to receive and process a media program sent via a broadcast distribution channel that was formerly transmitted via a unicast distribution channel prior to the notification.

Figure 7:
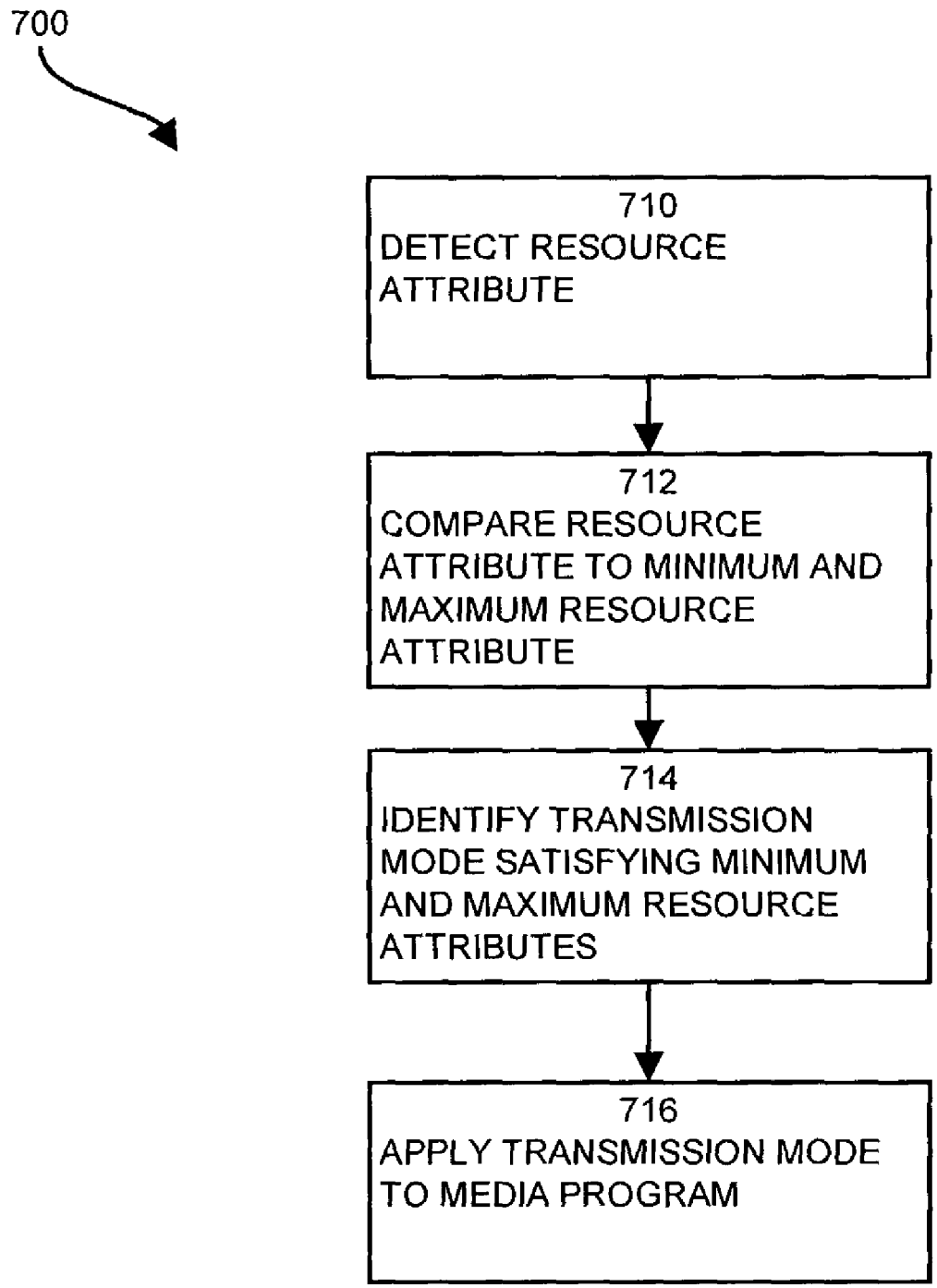
FIG. 7 is a flow chart of a procedure for identifying a transmission mode to be applied to a media program based on a range of resource attributes according to one embodiment of the invention.

FIG. 7 is a flow chart of a procedure for identifying a transmission mode to be applied to a media program based on a range of resource attributes according to one embodiment of the invention. This method is an alternative method to the graphic table depicted in FIG. 4 for identifying and applying transmission modes to media programs In step 710, the media server 110 detects a resource attribute.

In step 712, the media server 110 compares resource attributes to minimum and maximum resource attributes.

In step 714, the media server 110 identifies each transmission mode 130 (e.g. an error correction protocol or codec), which satisfies both the minimum and maximum resource attributes for particular transmission mode 130. This identifies one or a group (i.e. from which an individual transmission mode 130 could be further selected by the media server 110) of transmission modes 130 for the media server 110 to apply to a media program.

For example, a minimum resource attribute of 100 program recipients 140 and a maximum resource attributes of 1000 program recipients is associated with the forward error checking protocol. In that case, if a particular media program has an audience size of 500 media program recipients 140, after first identifying that the audience size of 500 falls within the minimum and maximum resource attributes, the media server 110 would identify that the forward error checking protocol to be the appropriate transmission mode 130 to apply to the media program in question.

In step 716, the media server 110 applies the identified transmission mode 130 to the media program.

FIG. 8 shows a transmission mode table with minimum 812 and maximum 814 audience limits according to one embodiment of the invention. The table 800 includes a list of transmission modes 810 and associated minimum resource attribute limits 812 (e.g. minimum audience sizes) and maximum attribute limits 814 (e.g. maximum audience sizes). The table 800 is an alternative to the graphic mode table of FIG. 4 for identifying a transmission mode 130 to be applied to a media program based on a range of resource attributes as described in more detail with respect to FIG. 7.

The features of the invention may be employed in data communications device and other computerized devices such as those manufactured by Cisco Systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, other arrangements of embodiments of the invention that are disclosed herein include software programs to perform the method embodiment steps and operations described above. As an example, a media server software control application, such as a data communications device operating system configured to operate as explained herein is considered an embodiment of the invention. More particularly, a computer program product is disclosed which has a computer-readable medium 115 including computer program logic encoded thereon that, when executed on at least one controller, causes the controller to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other device to cause such a device to perform the techniques explained herein as embodiments of the invention.

The methods embodiments of the invention may be implemented by computer software and/or hardware mechanisms within a data communications device apparatus. It is to be understood that the system of the invention can be embodied strictly as a software program, as software and hardware, or as hardware alone.

As described above, the invention is a method, employed on a media server 110, for selecting from among multiple distribution and transmission modes to transmit streaming video content. The method involves establishing and maintaining a unicast connection to a client (e.g. a media program recipient) 140 seeking to receive desired video content. Transmission of the actual media program may be switched to another distribution resource 120 such as a multicast or broadcast connection or to a different transmission mode than initially applied. The media server 110 analyzes and evaluates media program resource attributes such as audience size, transmission loss ratios of the media programs or other resource attributes such as network and/or server cost based on audience size and loss ratios, etc. in conjunction with the assignment of distribution resources 120 and the application of transmission modes 130 to the media programs in connection with their transmission to the media program recipients 140.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for transmitting a plurality of media programs in a network, comprising the steps of:

determining a first audience size of a first media program and a second audience size of a second media program;

comparing said first audience size with said second audience size to determine a relative value;

assigning a first distribution resource to said first media program and a second distribution resource to said second media program in response to said relative value, whereby assignment of distribution resources is made based on relative audience size;

applying one of a plurality of transmission modes to each said media program in response to the audience size and assigned distribution resource;

wherein said first media program and said second media program each have at least one recipient and said determining step further comprises the steps of:

receiving a media program request from each said recipient, determining said first audience size based upon a number of requests received for said first media program, and determining said second audience size based upon a number of requests received for said second media program, the second media program distinct from the first media program, and wherein said first distribution resource is a high distribution volume channel and said second distribution resource is a low distribution volume channel such that said relative value indicates a distribution requirement and said assigning step further comprises assigning said high distribution volume channel to the media program having the greater distribution requirement;

wherein applying one of the plurality of transmission modes to each said media program in response to the audience size and assigned distribution resource comprises:

applying to the media program assigned to the high distribution volume channel and having a larger audience size of one of the first audience size and the second audience size, a negative acknowledgement based correction mode when the high distribution volume channel comprises a broadband channel; and applying, to the media program assigned to the low distribution volume channel and having a smaller audience size of one of the first audience size and the second audience size, an acknowledgement based correction mode when the low distribution volume channel comprises a unicast channel.

2. The method of claim 1 wherein said media programs are delivered to a plurality of recipients, the method further comprising the steps of:

providing a control connection to each recipient; and detecting said audience sizes over said control connections.

3. The method of claim 1 wherein said determining step further comprises obtaining stored attribute data associated with each media program.

4. The method of claim 1 wherein said first audience size and said second audience size fluctuate over time, further comprising the steps of:

monitoring said relative value; and when said relative value changes, reassigning said low distribution volume channel to the media program having the smaller audience and said high distribution volume channel to the media program having the larger audience.

5. The method of claim 4 wherein said monitoring step is performed periodically.

6. The method of claim 4 wherein said monitoring step is performed at each media program recipient request.

7. The method of claim 4 wherein said monitoring step further comprises the steps of:

providing an attribute table for storing media programs and associated audience sizes;

updating said stored audience sizes;

comparing said stored audience sizes; and ranking said stored audience sizes to determine distribution requirements.

8. The method of claim 4 further comprises the step of:

providing a control channel to each media program recipient; and sending to said first and said second media program recipients over said control channels, notification of distribution resource reassignments.

9. The method of claim 1 wherein the step of applying one of the plurality of transmission modes to each said media program comprises the steps of:

providing a transmission mode table wherein each transmission mode has an associated audience size value;

comparing a detected audience size to audience size values in said transmission mode table;

identifying at least one transmission mode having an associated audience size substantially matching said detected audience size; and selecting one said identified transmission modes to be applied to said media program.

10. A media program distribution system, for transmitting a plurality of media programs in a network, comprising:

a media server for transmitting one of said media programs;

a controller coupled to the media server;

wherein the controller is configured to determine a first audience size of a first media program and a second audience size of a second media program;

the controller is configured to compare said first audience size with said second audience size to determine a relative value;

the media server is configured to assign a first distribution resource to said first media program and a second distribution resource to said second media program in response to said relative value, whereby assignment of distribution resources is made based on relative audience size;

the media server is configured to apply one of a plurality of transmission modes to each said media program in response to the audience size and distribution resource type;

wherein said first media program and said second media program each have at least one recipient and wherein, in order to perform said determining, said controller is configured to:

receive a media program request from each said recipient, determine said first audience size based upon a number of requests received for said first media program, and determine said second audience size based upon a number of requests received for said second media program, the second media program distinct from the first media program; and wherein said first distribution resource is a high distribution volume channel and said second distribution resource is a low distribution volume channel such that said relative value indicates a distribution requirement and, in order to perform said assigning, the media server is configured to assign said high distribution volume channel to the media program having the greater distribution requirement;

wherein when applying one of the plurality of transmission modes to each said media program in response to the audience size and distribution resource type the media server is configured to:

apply to the media program assigned to the high distribution volume channel and having a larger audience size of one of the first audience size and the second audience size, a negative acknowledgement based correction mode when the high distribution volume channel comprises a broadband channel; and apply, to the media program assigned to the low distribution volume channel and having a smaller audience size of one of the first audience size and the second audience size, an acknowledgement based correction mode when the low distribution volume channel comprises a unicast channel.

11. The system of claim 10 wherein said media programs are delivered to a plurality of recipients, and wherein said system is further configured to:
provide a control connection to each recipient; and
detect said audience sizes over said control connections.

12. The system of claim 10 wherein, to perform said determining, the controller is configured to read stored attribute data associated with each media program.

13. The system of claim 10 wherein said first audience size and said second audience size fluctuate over time, and said controller is further configured to:
monitor said relative value; and
when said relative value changes, reassign said low distribution volume channel to the media program having the smaller audience and said high distribution volume channel to the media program having the larger audience.

14. The system of claim 13 wherein said controller is configured to perform said monitoring periodically.

15. The system of claim 13 wherein said controller is configured to perform said monitoring at each media program recipient request.

16. The system of claim 13 wherein, to perform said monitoring, said controller is configured to:
provide an attribute table for storing media programs and associated audience sizes;
update said stored audience sizes;
compare said stored audience sizes; and
rank said stored audience sizes to determine distribution requirements.

17. The system of claim 13 wherein the media server is further configured to:
provide a control channel to each media program recipient; and
send to said first and said second media program recipients over said control channels, notification of distribution resource reassignments.

18. The system of claim 10 wherein, to perform said applying one of the plurality of transmission modes to each said media program, the controller is configured to:
provide a transmission mode table wherein each transmission mode has an associated audience size value;
compare a detected audience size to audience size values in said transmission mode table;
identify at least one transmission mode having an associated attribute value substantially matching said detected audience size; and
select one said identified transmission modes to be applied to said media program.

19. A computer program product that includes a computer readable medium having instructions stored thereon for transmitting a plurality of media programs, such that the instructions, when carried out by a computer, cause the computer to perform the steps of:
determining a first audience size of a first media program and a second audience size of a second media program;
comparing said first audience size with said second audience size to determine a relative value;
assigning a first distribution resource to said first media program and a second distribution resource to said second media program in response to said relative value, whereby assignment of distribution resources is made based on relative audience size;
applying one of the plurality of transmission modes to each said media program in response to the resource attribute and distribution resource type;
wherein said first media program and said second media program each have at least one recipient and said determining step further comprises the steps of:
receiving a media program request from each said recipient,
determining said first audience size based upon a number of requests received for said first media program, and
determining said second audience size based upon a number of requests received for said second media program, the second media program distinct from the first media program; and
wherein said first distribution resource is a high distribution volume channel and said second distribution resource is a low distribution volume channel such that said relative value indicates a distribution requirement and said assigning step further comprises assigning said high distribution volume channel to the media program having the greater distribution requirement;
wherein applying one of the plurality of transmission modes to each said media program in response to the audience size and assigned distribution resource comprises:
applying to the media program assigned to the high distribution volume channel and having a larger audience size of one of the first audience size and the second audience size, a negative acknowledgement based correction mode when the high distribution volume channel comprises a broadband channel; and
applying, to the media program assigned to the low distribution volume channel and having a smaller audience size of one of the first audience size and the second audience size, an acknowledgement based correction mode when the low distribution volume channel comprises a unicast channel.

20. A system having diverse distribution resources and a plurality of transmission modes to transmit a plurality of media programs in a network, comprising:
means for comparing said first audience size with said second audience size to determine a relative value;
means for assigning a first distribution resource to said first media program and a second distribution resource to said second media program in response to said relative value, whereby assignment of distribution resources is made based on relative audience size;
means for applying one of the plurality of transmission modes to each said media program in response to the resource attribute and distribution resource type;
wherein said first media program and said second media program each have at least one recipient and further comprising:
means for receiving a media program request from each said recipient,
means for determining said first audience size based upon a number of requests received for said first media program, and
means for determining said second audience size based upon a number of requests received for said second media program, the second media program distinct from the first media program; and
wherein said first distribution resource is a high distribution volume channel and said second distribution resource is a low distribution volume channel such that said relative value indicates a distribution requirement and said means for assigning further comprises means for assigning said high distribution volume channel to the media program having the greater distribution requirement;

wherein means for applying one of a plurality of transmission modes to each said media program in response to the audience size and assigned distribution resource comprises:

means for applying to the media program assigned to the high distribution volume channel and having a larger audience size of one of the first audience size and the second audience size, a negative acknowledgement based correction mode when the high distribution volume channel comprises a broadband channel; and means for applying, to the media program assigned to the low distribution volume channel and having a smaller audience size of one of the first audience size and the second audience size, an acknowledgement based correction mode when the low distribution volume channel comprises a unicast channel.

21. The method of claim 1 further comprising transmitting the first media program via the first distribution resource and transmitting the second media program via the second distribution resource.

22. The method of claim 1, wherein said first distribution resource is a broadcast channel and said second distribution resource is a unicast channel such that said relative value indicates a larger audience size of one of the first audience size and the second audience size and said assigning step further comprises assigning said broadcast channel to the media program having the larger audience size and assigning said unicast channel to the media program having a smaller audience size, relative to the media program having the larger audience size.

23. The method of claim 1, wherein said first distribution resource is a multicast channel and said second distribution resource is a unicast channel such that said relative value indicates a larger audience size of one of the first audience size and the second audience size and said assigning step further comprises assigning said multicast channel to the media program having the larger audience size and assigning said unicast channel to the media program having a smaller audience size, relative to the media program having the larger audience size.

24. The method of claim 1, wherein:

applying to the media program assigned to the high distribution volume channel and having the larger audience size of one of the first audience size and the second audience size, the negative acknowledgement based correction mode when the high distribution volume channel comprises the broadband channel comprises applying to the media program assigned to the high distribution volume channel and having the larger audience size of one of the first audience size and the second audience size, a negative acknowledgement (NAK) protocol, the NAK protocol operable to indicate receipt of a corrupt block of the media program by the recipient; and applying, to the media program assigned to the low distribution volume channel and having the smaller audience size of one of the first audience size and the second audience size, the acknowledgement based correction mode when the low distribution volume channel comprises a unicast channel comprises applying, to the media program assigned to the low distribution volume channel and having the smaller audience size of one of the first audience size and the second audience size, an acknowledgement (ACK) based protocol, the ACK based protocol operable to indicate receipt of an error-free block of the media program by the recipient and the ability for the recipient to accept additional blocks of the media program.

25. The method of claim 10 wherein:

providing a control channel to each recipient comprises providing a unicast control channel to each recipient;

in response to reassigning the low distribution volume channel to the media program having the smaller audience and the high distribution volume channel to the media program having the larger audience, maintaining the unicast control channel with each recipient; and sending to said first and said second media program recipients over said control channels, notification of distribution resource reassignments further comprises sending to said first and said second media program recipients over the unicast control channels control signals that configured to cause the recipients to initiate an action that allows the recipients to receive a media program transmitted via the reassigned channel.

* * * * *